United States Patent [19]

Edwards et al.

[11] Patent Number: 4,490,581
[45] Date of Patent: Dec. 25, 1984

[54] CLOCK SELECTION CONTROL CIRCUIT

[75] Inventors: Ivan L. Edwards, Downers Grove; Max S. Macrander, Warrenville; Ashfaq R. Khan, Glendale Heights, all of Ill.

[73] Assignee: GTE Automatic Electric Labs Inc., Northlake, Ill.

[21] Appl. No.: 431,900

[22] Filed: Sep. 30, 1982

[51] Int. Cl.³ ............................. G06F 1/04; H04Q 3/54
[52] U.S. Cl. ..................................... 179/18 EE; 371/8
[58] Field of Search ...................... 179/18 EE, 18 ES; 371/8; 307/441, 442, 480, 219

[56] References Cited

U.S. PATENT DOCUMENTS 4,322,580  3/1982  Khan et al. .................... 179/18 EE Primary Examiner—Thomas W. Brown
Attorney, Agent, or Firm—Gregory G. Hendricks; Peter Xiarhos

[57] ABSTRACT

A circuit which controls the selection and activation of one of a plurality of clock circuits arranged in copies. Selection circuitry is used to detect failure of an on-line clock circuit, scan a plurality of available clock circuits in a predetermined sequence and place the next available properly operating clock circuit on line. Control circuitry prevents erroneous clock selection during power-up/power down operations and enables predetermined clock circuit copies to be disabled.

9 Claims, 1 Drawing Figure

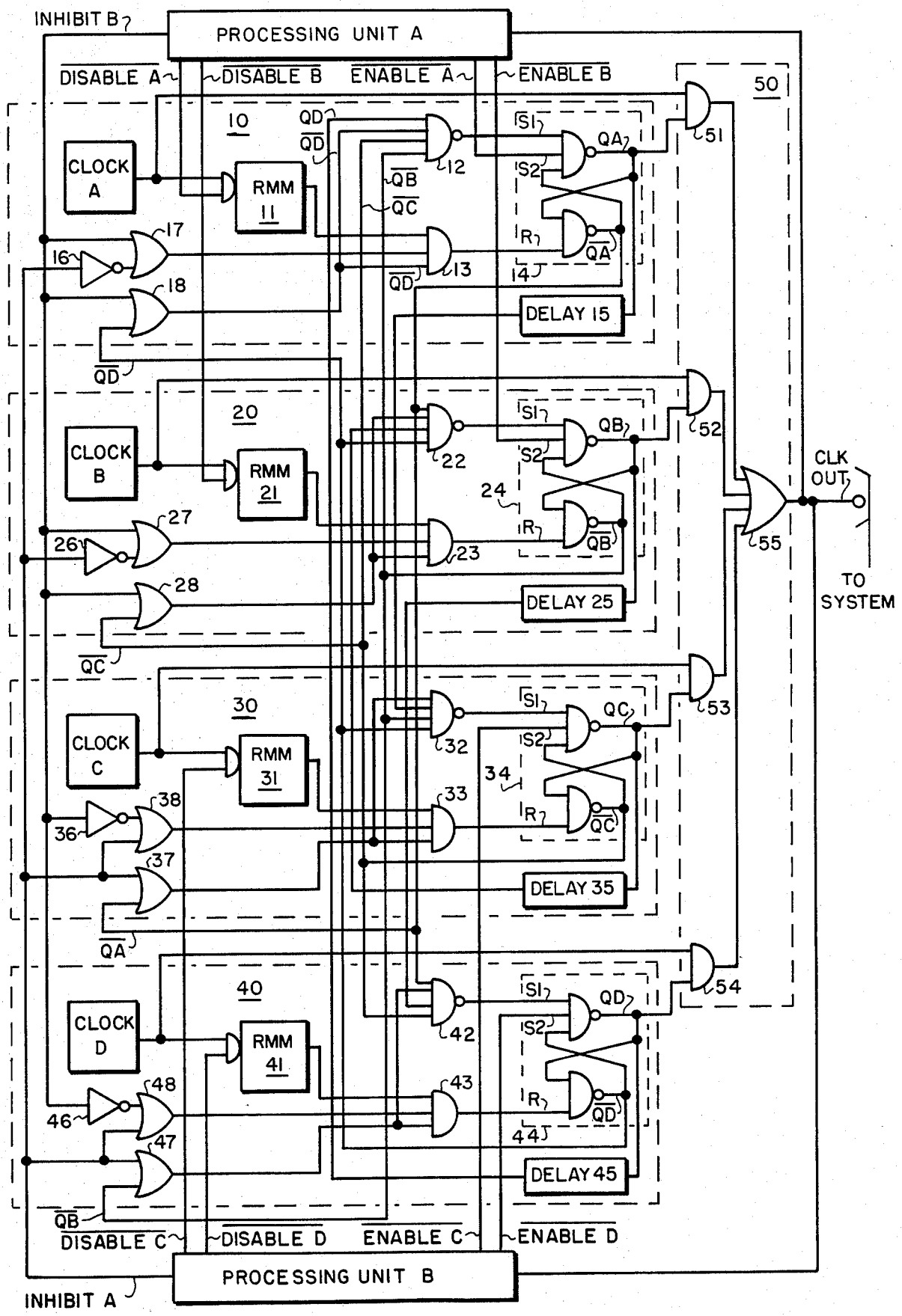

CLOCK SELECTION CONTROL CIRCUIT

FIELD OF THE INVENTION

The present invention relates to telephone switching systems and more particularly to a clock selection control circuit for use in a telephone switching system having a plurality of clock circuit copies.

BACKGROUND OF THE INVENTION

Telephone switching systems have been equipped with redundant clock circuits to prevent interruptions in service due to failure of a clock circuit. These telephone systems typically include a pair of clock circuits arranged in an active-standby manner. Such an arrangement is based on the assumption that only one fault can exist at one time and therefore two clock circuits were deemed sufficient. Only minimal logic circuitry was needed to control selection of active and standby clock circuits, since such circuitry was only required to detect failure of the active clock circuit and then switch to the standby clock circuit. However, such systems are subject to interruptions in service, if there is a failure in the standby clock circuit, which is forced on line upon detection of a failure in the active clock circuit.

In order to provide increased reliability additional clock circuits and more sophisticated clock selection circuitry are required. An example of such a sophisticated clock selection circuit, and associated multiple clock circuits, is disclosed in U.S. Pat. No. 4,322,580, issued to A. R. Khan, et al, on Mar. 30, 1982. That clock selection circuit insures that only a properly operating standby clock circuit is switched on-line upon detection of a failure in the active clock circuit. However, that arrangement is susceptible to erroneous operation in the event of a processor communication link failure, or power-up/power-down operations.

Accordingly, it is the object of the present invention to provide a novel, highly reliable clock selection control circuit.

SUMMARY OF THE INVENTION

In accordance with the present invention, a clock selection control circuit is provided for use in a telephone switching system which includes a plurality of clock circuits, each operative to provide a clock signal, and first and second processing units, each operative to provide first and second inhibit signals, respectively.

The clock selection control circuit of this invention includes first and second arrangements of one or more clock selection means each including first, second and third outputs. Each clock selection means is connected to an associated one of the clock circuits, to the third output of all other clock selection means and to the second output of an associated one of the clock selection means. Each clock selection means is operative to provide signals on the first, second and third outputs, and each is operative in response to a clock signal from an associated clock circuit, the third output signal from all other selection means and the second output signal from the associated clock selection means, to provide the first output signal. Each of the clock selection means is further operative in response to first output signal and a delay period to provide the second output signal. Each of the clock selection means is further operated in response to an absence of the clock signal from the associated clock circuit to provide the third output signal, and each of the clock selection means is further operative in response to an absence of the third output signal from the associated clock selection means to provide the third output signal. Each of the first arrangement of clock selection means is further operative in response to the first inhibit signal to simulate the third output signal from the associated clock selection means and each of the second arrangement of clock selection means is further operative in response to the second inhibit signal to simulate the third output signal from the associated clock selection means. Each of the first arrangement of clock selection means is further operative in response to the second inhibit signal to provide the third output signal; and each of the second arrangement of clock selection means is further operative in response to the first inhibit signal to provide the third output signal.

DESCRIPTION OF THE DRAWING

The single FIGURE of the accompanying drawing is a logic diagram of a clock selection control circuit in accordance with the present invention.

DESCRIPTION OF THE PREFERRED EMBODIMENT

Referring now to the accompanying drawing, the clock selection control circuit of the present invention is shown. Clock selection circuits 10, 20, 30 and 40 are shown connected to first and second processing units, i.e., PROCESSING UNITS A and B. These clock selection circuits are further adapted to be connected to the remainder of an associated telephone switching system via output gate circuit 50. Clock selection circuit 10 includes retriggerable monostable multivibrator (RMM) 11 connected between clock circuit A and reset gate 13 whose output is connected to the reset (R) input of latch 14. Gate 13 is also connected to the reset output of latch 44 ($\overline{QD}$) via OR gate 18, and gate 13 is further connected to PROCESSING UNIT B via OR gate 17 and inverter 16. OR gates 17 and 18 are both further connected to PROCESSING UNIT A, via the INHIBIT B lead, and RMM 11 is connected to PROCESSING UNIT A via the $\overline{\text{DISABLE A}}$ lead.

Set gate 12 is connected to the first set (S1) input of latch 14 and PROCESSING UNIT A is connected to the second set (S2) of latch 14 via the $\overline{\text{ENABLE A}}$ lead. The inputs to set gate 12 are connected to the reset outputs, $\overline{QB}$, $\overline{QC}$ and $\overline{QD}$, of latch circuits 24, 34 and 44, respectively, and to the set output, QD, of latch circuit 44 via delay circuit 45. Clock selection circuit 10 further includes delay circuit 15 connected between the set output, QA, of latch 14, and associated clock selection circuit 30.

The remaining clock selection circuits are arranged similarly with clock circuits, retriggerable monostable multivibrators, latch circuits and associated gating circuits.

The set outputs of each latch circuit, QA, QB, QC, QD, are further connected to clock gate circuits 51, 52, 53, 54, respectively. These clock gate circuits are also connected to an associated clock circuit, CLOCK A, B, C and D, respectively. The outputs of the clock gate circuits are connected to OR gate 55 which provides the clock out (CLK OUT) signal to PROCESSING UNITS A and B, and to the remainder of the associated telephone switching system.

The clock selection control circuit operates to disable the failed clock circuit, by testing and selecting clock circuits in a predetermined sequence. The sequence of switching is from clock circuit A to C to B to D to A.

To implement this sequencing pattern a set gate input for each latch circuit is connected to the set output of the clock selection circuit immediately preceding in the selection sequence. Other inputs of the set gate are connected to the reset outputs of all other clock selection circuits. An input to the reset gate of each clock selection circuit is further connected to the reset output of the latch associated with the clock selection circuit immediately preceding in the selection sequence. The details of this connection arrangement have previously been described.

The processing units and clock selection circuits are arranged in duplicate copies. PROCESSING UNIT A and clock selection circuits 10 and 20 form a first arrangement or first copy (Copy 0) while PROCESSING UNIT B and clock selection circuits 30 and 40 form a second arrangement or second copy (Copy 1). Each clock selection circuit has an input gating circuit associated with it. For example, the input gating circuit associated with clock selection circuit 10 includes gates 16, 17 and 18. Copies 0 and 1 are also associated with first and second arrangements of gating circuits, respectively.

Each processing unit initializes the latches in the clock selection circuit of its associated copy via enable and disable signals on the enable and disable leads. A typical initialization arrangement would be for PROCESSING UNIT A to enable clock circuit A and disable CLOCKS B, C and D. To do this, the processing units provide logic 0 signals on the $\overline{\text{ENABLE A}}$ lead and the $\overline{\text{DISABLE}}$ B, C and D leads. These processing unit signals then force latch 14 to set and latches 24, 34 and 44 to reset, thus enabling clock circuit A to provide clock signals on the CLK OUT lead.

Monostable multivibrators RMM 11, 21, 31 and 41, generate a 200 nanosecond timing pulse. However, since they are retriggerable, this 200 nanosecond pulse begins every time a pulse appears at its input. CLOCKS A, B, C and D typically operate at 12 MHz which results in an 80 nanosecond period. Consequently the 200 nanosecond monostable multivibrators are normally retriggered before they time out, i.e., every 80 nanoseconds, and thus they normally provide a continuous logic level 1 signal. If a clock circuit fails, the clock pulses disappear and the associated retriggerable multivibrator times out after 200 nanoseconds and provides a logic 0 signal.

In the event of a failure of clock circuit A the clock selection circuit would select the next properly operating clock circuit in the clock selection sequence, i.e., CLOCK C.

Assuming CLOCK C is operating properly it will cause RMM 31 to apply a logic level 1 signal to the first input of gate 33. When CLOCK A fails, RMM 11 generates a logic 0 signal which was detected on the first input to gate 13. This logic 0 signal is gated by gate 13 to latch circuit 14 and causes latch circuit 14 to reset, thereby providing a logic level 1 signal on the reset output of latch circuit 14. Consequently a logic level 1 signal appears via OR gate 37 at the third input of gate 33. Since the second input to this gate is normally at a logic level 1, a logic level 1 signal appears at the reset (R) input of latch circuit 34. The inputs to set gate 32 are connected to the reset outputs, $\overline{\text{QA}}$, $\overline{\text{QB}}$ and $\overline{\text{QD}}$, of latches 14, 24 and 44, respectively. Since all of those outputs are in the reset state, they provide logic 1 signals on these inputs to set gate 32. This gate also includes a connection to the set output, QA, of latch circuit 14 via delay circuit 15. This latch circuit 14 includes first, second and third outputs, QA, QA delayed and $\overline{\text{QA}}$, respectively. Similarly, the other latch circuits also have first, second and third outputs.

Immediately upon detection of the failure of CLOCK A, the reset output of latch circuit 14 switches to a logic level 1 signal and the set output of latch circuit 14 switches to a logic level 0 signal. However, this logic level 0 signal does not appear at the input to gate 32 until the time delay of delay circuit 15 has elapsed. Therefore logic level 1 signals appear at all four inputs to gate 32, which then causes latch circuit 34 to set. The delay timing is selected to be long enough to allow latch circuit 34 to set before such time-out. At the expiration of this delay period, delay circuit 15 applies a logic level 0 signal to gate 32 which causes a logic level 1 signal to appear at the S1 input of latch circuit 34. However, this signal has no impact since latch circuit 34 had previously been set.

In the event that CLOCK C had also failed the clock selection circuit would not enable CLOCK C but would enable the next properly operating clock circuit in the clock selection sequence.

If one copy of the clock selection control circuit is powered down and then up, it may go into an unstable state and cause a new clock circuit to be selected even though a failure did not occur in the previously selected clock circuit. If the new clock circuit is not fully operational, alarms and degradation of service can result. This problem is eliminated through use of first and second inhibit leads, INHIBIT A and INHIBIT B, respectively, and OR gates 18, 28, 37 and 47.

If copy 0 is to be powered down, PROCESSING UNIT B provides a logic level 1 signal on the INHIBIT A lead. This logic level 1 signal then appears at the first input of gates 37 and 47, causing these gates to provide a logic level 1 signal on their outputs, regardless of the state of $\overline{\text{QA}}$ and $\overline{\text{QB}}$ signals. This inhibits detection of any logic level 0 signal required by the reset gates to reset a clock selection circuit and allow a new clock circuit to be selected. Thus, when a logic level 1 signal appears on the INHIBIT A lead, copy 1's selection circuits are immune from variations in the status of copy 0's clock selection circuits. Similarly, when PROCESSING UNIT A applies a logic level 1 signal to the INHIBIT B lead, copy 0's selection circuits are immune from variations in the status of copy 1's clock selection circuits.

Additional control of the status of the clock selection circuits is provided by OR gates 17, 27, 38 and 48, and associated inverters 16, 26, 36 and 46, respectively. A processing unit can disable a selected clock selection circuit by simulating a clock failure. For example, PROCESSING UNIT B can simulate a failure of CLOCKS A and B by providing a logic level 1 signal on the INHIBIT A lead. This logic level 1 signal is inverted to a logic level 0 by inverters 16 and 26 and applied to gates 17 and 27, respectively. Normally a logic level 1 signal does not appear on the INHIBIT B lead at the same time as the logic level 1 signal appears on the INHIBIT A lead. Under these conditions, two logic level 0 signals appear at the inputs of OR gates 17 and 27 and the resultant logic level 0 signals appearing at their outputs cause the clock selection circuits in copy 0 to be reset, thus simulating failure of CLOCKS A and B. Similar results occur in copy 1 when failures of CLOCKS C and D are simulated.

If logic level 1 signals improperly appear on the IN-HIBIT A and B leads at the same time, they cancel each other and prevent simulation of a clock circuit failure. Under these conditions the logic level 1 signals on the inhibit leads cause OR gates 17, 27, 38 and 48, to provide a logic level 1 signal, regardless of the status of the signal appearing at the inverted input to these gates. Therefore, the logic level 0 signal required for clock failure simulation is prevented if both inhibit signals improperly occur at the same time.

Thus the clock Selection Control Circuit of the present invention selects clock circuits in a predetermined sequence, provides immunity from erroneous clock selection due to power-up/power-down conditions and simulates clock failures to disable selected clock selection circuits.

It will be obvious to those skilled in the art that numerous modifications of the present invention can be made without departing from the spirit of the invention which shall be limited only by the scope of claims appended hereto.

What is claimed is:

1. A clock selection control circuit for use in a telephone switching system including a plurality of clock circuits, each operative to provide a clock signal, and first and second processing units, each operative to provide first and second inhibit signals, respectively, said clock selection control circuit comprising:

first and second arrangements of one or more clock selection means each including first, second and third outputs, each clock selection means connected to an associated one of said clock circuits, to said third output of all other clock selection means and to said second output of an associated one of said clock selection means, each operative to provide signals on said first, second and third outputs, each operative in response to a clock signal from an associated clock circuit, said third output signal from all other selection means and said second output signal from said associated clock selection means, to provide said first output signal, each of said clock selection means further operative in response to said first output signal and a delay period to provide said second output signal, each of said clock selection means further operative in response to an absence of said clock signal from said associated clock circuit to provide said third output signal; each of said clock selection means further operative in response to an absence of said third output signal from said associated clock selection means to provide said third output signal;

each of said first arrangement of clock selection means further operative in response to said first inhibit signal to simulate said third output signal from said associated clock selection means;

each of said second arrangement of clock selection means further operative in response to said second inhibit signal to simulate said third output signal from said associated clock selection means; and output gating means connected to all of said clock selection means and to said plurality of clock circuits, operative in response to each of said first output signals and a clock signal from an associated clock circuit to provide a clock out signal.

2. A clock selection control circuit as claimed in claim 1, wherein: each of said first arrangement of clock selection means are further operative in response to said second inhibit signal to provide said third output signal; and each of said second arrangement of clock selection means are further operative in response to said first inhibit signal to provide said third output signal.

3. A clock selection control circuit as claimed in claim 1, wherein: said first and second processing units are each operative to provide an enable signal associated with each clock selection means of said first and second arrangements respectively; each of said clock selection means operative in response to said associated enable signal to provide said first output signal.

4. A clock selection control circuit as claimed in claim 1, wherein: said first and second processing units are each operative to provide a disable signal associated with each clock selection means of said first and second arrangements respectively; each of said clock selection means further operated in response to said associated disable signal to provide said third output signal.

5. A clock selection control circuit as claimed in claim 1, wherein there is further included:

a first arrangement of one or more input gating means, each connected to one of said first arrangement of clock selection means; each of said first arrangement of input gating means further connected to said first processing unit and said third output of said associated clock selection means, each operative in response to said first inhibit signal to simulate said third output signal from said associated clock selection means; and a second arrangement of one or more input gating means each connected to one of said second arrangement of clock selection means, each of said second arrangement of input gating means further connected to said second processing unit and said third output of said associated clock selection means, each operative in response to said second inhibit signal to simulate said third output signal from said associated clock selection means.

6. A clock selection control circuit as claimed in claim 2, wherein there is further included:

a first arrangement of one or more input gating means, each connected to one of said first arrangement of clock selection means, each of said first arrangement of input gating means further connected to said first and second processing units;

each of said first arrangement of input gating means operative in response to said second inhibit signal to provide a first reset signal, said connected clock selection means operative in response to said first reset signal to provide said third output signal, and further operative in response to said first and second inhibit signals to inhibit said first reset signal;

a second arrangement of one or more input gating means each connected to one of said second arrangement of clock selection means, each of said second arrangement of input gating means further connected to said first and second processing units;

each of said second arrangement of input gating means operative in response to said first inhibit signal to provide a second reset signal, said connected clock selection means operative in response to said second reset signal to provide said third output signal, and further operative in response to said first and second inhibit signals to inhibit said second reset signal.

7. A clock selection control circuit as claimed in claim 5, wherein: each of said first and second arrangements of input gating means comprises an OR gate.

8. A clock selection control circuit as claimed in claim 6, wherein each of said first arrangement of input gating means comprises: an inverter connected to said second processing unit and an OR gate connected to said first processing unit and said inverter.

9. A clock selection control circuit as claimed in claim 6, wherein each of said second arrangement of input gating means comprises: an inverter connected to said first processing unit and an OR gate connected to said second processing unit and said inverter.

* * * * *